US 8,275,516 B2

(12) United States Patent
Murphy

(10) Patent No.: US 8,275,516 B2
(45) Date of Patent: Sep. 25, 2012

(54) AGRICULTURAL VEHICLE AUTOPILOT ROLLOVER RISK ASSESSMENT SYSTEM

(75) Inventor: Michael D Murphy, Gilroy, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 523 days.

(21) Appl. No.: 12/506,435

(22) Filed: Jul. 21, 2009

(65) Prior Publication Data
US 2011/0022267 A1 Jan. 27, 2011

(51) Int. Cl.
*B60G 17/016* (2006.01)
(52) U.S. Cl. .......................... 701/38; 701/124
(58) Field of Classification Search ............. 701/38, 701/124
See application file for complete search history.

(56) References Cited

U.S. PATENT DOCUMENTS

| | | | |
|---|---|---|---|
| 3,937,423 A * | 2/1976 | Johansen | 244/3.22 |
| 4,284,987 A | 8/1981 | Gibson et al. | |
| 5,136,513 A | 8/1992 | Sol et al. | |
| 5,899,288 A * | 5/1999 | Schubert et al. | 180/89.12 |
| 5,922,041 A * | 7/1999 | Anderson | 701/468 |
| 5,970,481 A * | 10/1999 | Westerlage et al. | 705/417 |
| 6,002,974 A | 12/1999 | Schiffmann | |
| 6,002,975 A | 12/1999 | Schiffmann | |
| 6,038,495 A | 3/2000 | Schiffmann | |
| 6,129,306 A * | 10/2000 | Pham | 244/2 |
| 6,157,295 A | 12/2000 | Steiner et al. | |
| 6,170,594 B1 * | 1/2001 | Gilbert | 180/282 |
| 6,192,305 B1 | 2/2001 | Schiffmann | |
| 6,262,658 B1 | 7/2001 | O'connor | |
| 6,397,133 B1 | 5/2002 | Van der Pol et al. | |
| 6,954,140 B2 | 10/2005 | Holler | |
| 7,222,010 B2 | 5/2007 | Suzuki et al. | |
| 7,236,864 B2 | 6/2007 | Ogata et al. | |
| 7,239,952 B2 | 7/2007 | Bauer | |
| 7,269,483 B2 | 9/2007 | Schubert et al. | |
| 7,386,384 B2 | 6/2008 | Lee et al. | |
| 7,403,848 B2 | 7/2008 | Schubert et al. | |
| 7,412,314 B2 | 8/2008 | Schubert | |
| 7,422,087 B2 | 9/2008 | Geborek | |
| 7,440,844 B2 | 10/2008 | Barta et al. | |
| 7,479,897 B2 | 1/2009 | Gertsch et al. | |
| 2003/0088349 A1 * | 5/2003 | Schubert et al. | 701/36 |
| 2003/0146829 A1 * | 8/2003 | Carlson et al. | 340/440 |
| 2004/0039520 A1 * | 2/2004 | Khavakh et al. | 701/201 |
| 2004/0102894 A1 | 5/2004 | Holler | |
| 2005/0206229 A1 * | 9/2005 | Lu et al. | 303/123 |
| 2007/0129867 A1 | 6/2007 | Huang et al. | |
| 2008/0208416 A1 * | 8/2008 | Yuet et al. | 701/50 |
| 2008/0272899 A1 | 11/2008 | Penzottl | |
| 2008/0312812 A1 | 12/2008 | Fitzgibbons et al. | |
| 2008/0312813 A1 * | 12/2008 | Sverrisson | 701/124 |
| 2009/0222204 A1 * | 9/2009 | Roberts et al. | 701/215 |

(Continued)

OTHER PUBLICATIONS

Murphy, "Tractor Overturn Hazards", Penn State Department of Agricultural and Biological Engineering, date unknown.

(Continued)

*Primary Examiner* — Behrang Badii
*Assistant Examiner* — Shardul Patel
(74) *Attorney, Agent, or Firm* — NUPAT, LLC; Morrison Ulman

(57) ABSTRACT

A rollover risk assessment system includes sensors and a processor for estimating rollover risk associated with maneuvering on varying terrain.

29 Claims, 18 Drawing Sheets

U.S. PATENT DOCUMENTS

| | | | | |
|---|---|---|---|---|
| 2010/0169009 | A1* | 7/2010 | Breed et al. | 701/208 |
| 2010/0198492 | A1* | 8/2010 | Watanabe | 701/124 |
| 2010/0312428 | A1* | 12/2010 | Roberge et al. | 701/23 |
| 2011/0054729 | A1* | 3/2011 | Whitehead et al. | 701/29 |
| 2011/0118929 | A1* | 5/2011 | Takae et al. | 701/29 |

OTHER PUBLICATIONS

Kise, et al., "Sensor-in-the-loop tractor stability control: Look-ahead attitude prediction and field tests", Computers and Electronics in Agriculture, v. 52, p. 107-118, 2006.

Liljedahl, et al., "Tractors and their power units", Chapter 11, Van Nostrand Reinhold, New York, 1989.

Liu, et al., "Application of a Tractor Stability Index for Protective Structure Deployment", Journal of Agricultural Safety and Health Special Issue, v. 1, p. 171-181, 1998.

Nichol, et al., "Simplified Overturn Stability Monitoring of Agricultural Tractors", Journal of Agricultural Safety and Health, v. 11, p. 99-108, 2005.

Yisa, et al., "Stability criteria for tractor-implement operation on slopes", Journal of Terramechanics, v. 35, p. 1-19, 1998.

Penn State, Hazardous Occupations Safety Training in Agriculture Task Sheet 4.12, "Tractor Stability", 2004.

Murphy, et al., "Tractor stability indicator", Applied Ergonomics, v. 16, p. 187-191, 1985.

Farm Safety Association, "Prevent tractor overturns", Mar. 2000.

* cited by examiner

Hazards

Slope
Bump
Ditch
Speed
Turn
CG Position
Flat tire

Warnings

CG near limit
Roll angle too great
Planned turn dangerous

Fig. 10

Cruise / Coast

Assume slope ahead is the same as current slope

Fig. 16

AGRICULTURAL VEHICLE AUTOPILOT ROLLOVER RISK ASSESSMENT SYSTEM

TECHNICAL FIELD

The disclosure is generally related to the field of rollover warning systems and methods for autopilot-guided agricultural vehicles.

BACKGROUND

About 50% of agricultural accident fatalities occur in tractor rollovers. The end can come quickly for an unsuspecting farmer as the time from "point of no return", when rollover is inevitable, to impact takes less than one second. D. J. Murphy et al. (Applied Ergonomics 1985, 16.3, 187-191) describe a plausible rollover scenario:

"A tractor operator is baling hay with a large round baler. He is operating the tractor at 4 mph on ground that starts out with a 5% slope at the outer edges of the field. The windrows on the outside of the field are sufficiently rounded, so he hasn't had to slow down to make turns. But as he moves toward the center of the field, the slope has gradually increased to 20% and the turns have grown slightly tighter."

"He hasn't cut his speed yet, but he has noticed that there is less time to correct his steering after the turn to stay on the windrow. On the next round, a narrow rise, where the inside rear tire travels, raises the slope to 23% and the turning angle is tightened once again. Unbeknownst to the operator, the slight increase in slope, decrease in radius, and constant speed put his tractor right on the brink of overturn."

"As he starts into the turn of this new round, the operator, from previous experiences, senses that he needs to slow down. But just as he reaches for the throttle, his eye catches sight of a groundhog hole that the front wheel is about to drop into. The presentation of this new bit of stimuli causes the slightest hesitation as it is transmitted to the brain and analyzed. Almost instinctively, the operator quickly yanks the steering wheel tighter to avoid the hole. This final act results in the tractor rolling over."

Tractor stability is a widely studied topic because of its importance to farm safety. Static stability refers to the effect of tractor attitude (pitch, roll, and yaw) and the projection of the center of gravity inside or outside a stability baseline. Dynamic stability takes into account effects of motion, speed and turning maneuvers.

FIG. 1 shows a rear view of a tractor 105 on slope 110. The position of the tractor's center of gravity (CG) 115 is marked by a circle with a cross inscribed in it. Arrow 120 is drawn along a vertical line coincident with the center of gravity; i.e. it shows the direction from the center of gravity to the center of the earth. In FIG. 1 arrow 120 crosses the slope just inside the tractor's rear wheel. If the tractor were to tip such that the arrow lay outside the wheel, the tractor would roll over in the direction of curved arrow 125.

FIG. 2 is a tractor stability baseline diagram. The diagram shows a top view of a tractor's wheels (200, 205) and center of gravity 210. Dotted trapezoid 215 connects points at the outside, center of each wheel where the wheel touches the ground. This trapezoid is called the stability baseline. If a line (such as arrow 120 of FIG. 1) drawn from the center of gravity toward the center of the earth passes within the stability baseline, the tractor is stable. On the other hand if the line passes outside the baseline, the tractor is unstable and will roll over.

Rollovers may occur to the side, rear or front. Most often, side rollovers are the result of driving on too steep a slope while rear rollovers are caused by trying to pull an object with a hitch point located too high on the tractor. Front rollovers are rare. However, rollovers may occur for any number of reasons that contribute to an accident chain.

FIG. 3 lists common hazards that increase rollover risk. These hazards include driving on too steep a slope and encounters with bumps or ditches. Some maneuvers, such as uphill turns, are safe at slow speed, yet pose significant rollover risk at higher speeds. Sharp turns increase risk compared to gradual turns. The position of a tractor's center of gravity affects rollover risk greatly. High center of gravity conditions caused by unusual loads (e.g. spray tanks) or lifted implements (e.g. buckets) increase rollover risk. Driving with a flat tire can make an otherwise tolerable slope traverse impassable.

A common theme among rollover hazards is that it is not always easy for a tractor operator to perceive the level of rollover risk associated with a particular maneuver. Driving along a particular path may be safe sometimes and dangerous at other times depending on speed, center of gravity location, type of tractor and other factors. Therefore, what are needed are systems and methods for warning tractor operators of rollover hazards as far in advance as possible.

BRIEF DESCRIPTION OF THE DRAWINGS

FIG. 3 lists common hazards that increase rollover risk.
FIG. 10 lists warnings for conditions leading to increased rollover risk.
FIG. 16 illustrates "cruise" mode operation.

DETAILED DESCRIPTION

Figure 1:
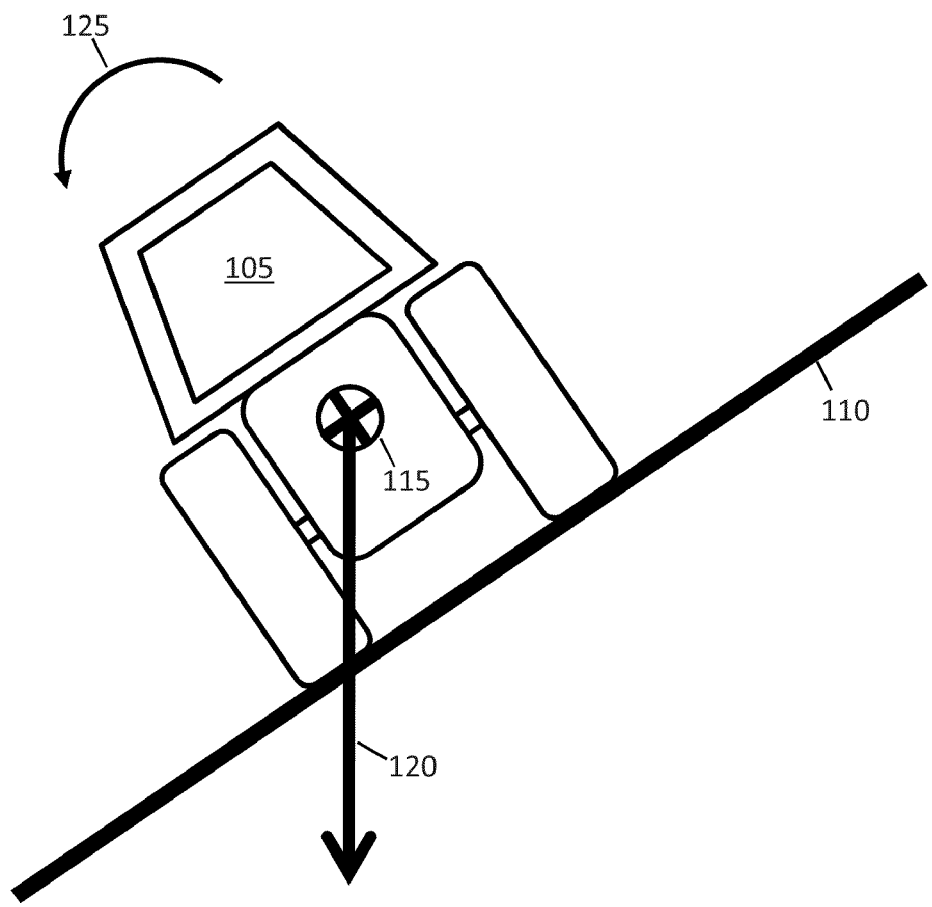
FIG. 1 shows a rear view of a tractor on a slope.
Figure 2:
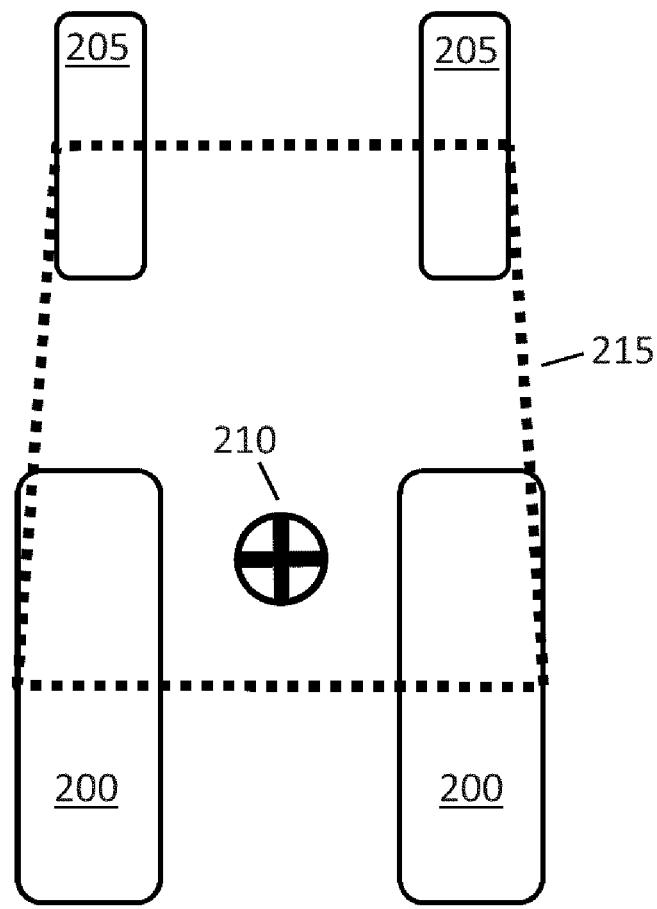
FIG. 2 is a tractor stability baseline diagram.

Farm tractors are increasingly driven by autopilot. Current autopilot systems primarily control tractor steering, but in the future throttle, brakes and implement operations may all be controlled by autopilot systems. Autopilots help farmers complete field application faster, more accurately, safely and comfortably, and with less operator fatigue than ever before. With autopilots, tractors can work at night or in dusty and low-visibility conditions to avoid losing valuable field time. Autopilots also save time by allowing operators to drive faster with better precision and no field call-backs.

A tractor may also be driven by a human operator but guided by an autopilot; i.e. the human operator executes commands issued by the autopilot. Throughout this disclosure systems and methods are applicable to both autopilot-driven and autopilot-guided operations. Further, the systems and methods are not restricted to tractors; they are also applicable to a wide range of agricultural vehicles and other vehicles.

Inertial sensors, continuously calibrated by state-of-the-art global navigation satellite system (GNSS, e.g. GPS, GLONASS, Galileo, etc.) receivers, enable autopilot systems to guide a farm tractor with one-inch accuracy. This capability translates into smaller overlaps between passes across a field, and increases the efficiency of precision operations like drip tape irrigation and strip tillage.

An operator in an autopilot-driven tractor is not necessarily aware of how close the tractor is to its rollover point. Distractions, such as monitoring the farm work being performed, may prevent the operator from noticing an unsafe situation develop. Even when full attention is available, an operator may not realize how close to rollover he is. Experience is not always an accurate guide as a path driven slowly may become unsafe at higher speeds. (Flying an aircraft by reference to instruments, rather than visually, is similar in that human senses may be unreliable guides for controlling a machine.) The rollover warning system described here uses autopilot sensors to monitor and/or predict rollover risk. Risk information and rollover warnings can save lives, train operators to recognize unsafe conditions, and prevent equipment damage.

In the future, human operators may not be present in every tractor. Fleets of tractors may operate in formation with a human present in only the lead tractor, for example. Or single tractors may be controlled remotely. Whether or not a human is present, an autopilot driving a tractor must be aware of rollover risk. The autopilot may provide a rollover warning to a local operator (e.g. tractor driver), a remote operator (e.g. a person monitoring an autonomous tractor from a remote location), or both. In this application "operator" may refer to either a local or a remote operator. In addition to, or instead of, providing a warning the autopilot may take preventive action when present or future rollover risk exceeds an acceptable threshold. For example, based on a planned path of operation the autopilot may reduce the speed of tractor when reaching high-risk terrain or a high-risk maneuver. The autopilot may also change the planned path, or suggest such changes to an operator, in order to reduce rollover risk.

Figure 4:
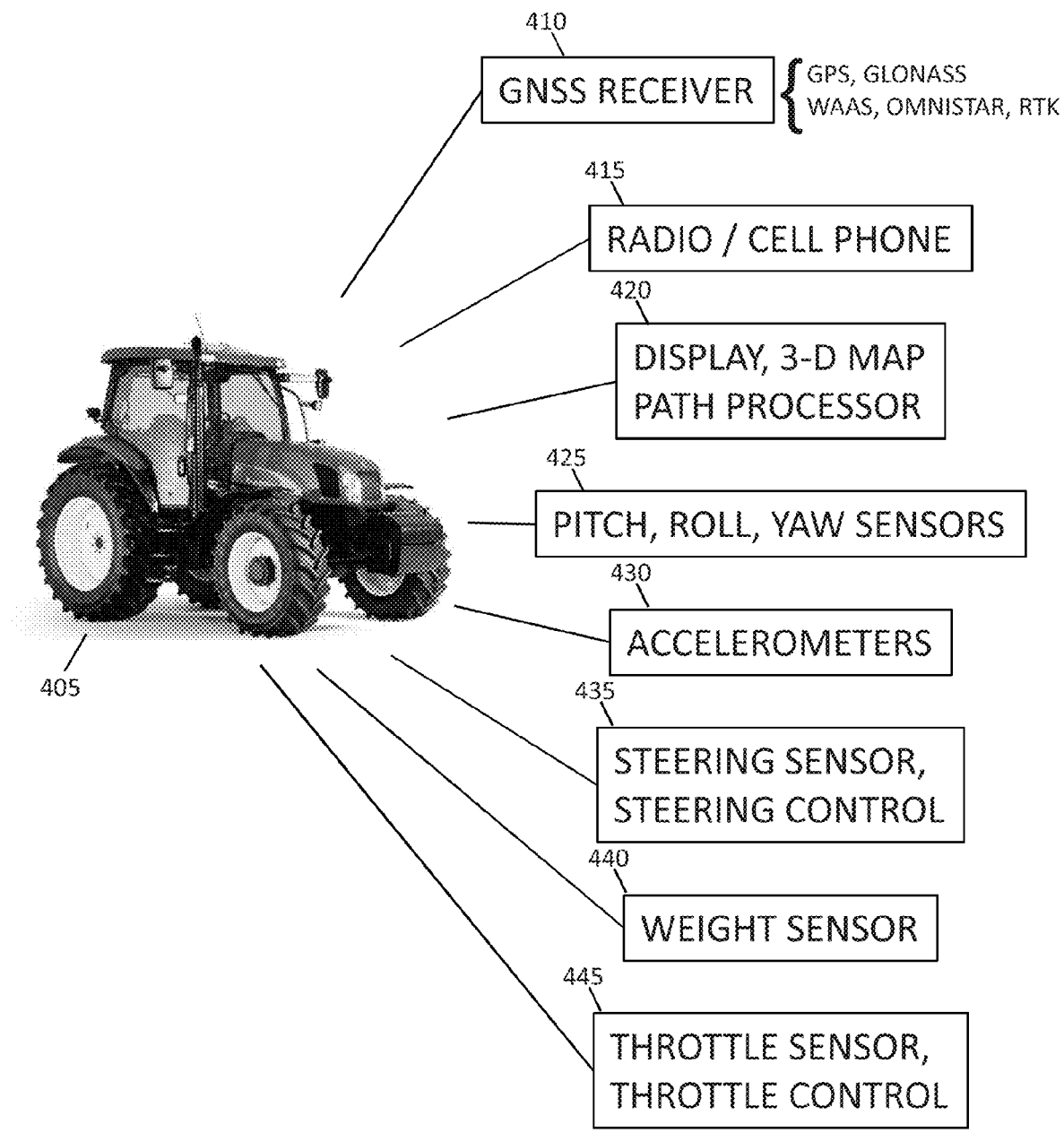
FIG. 4 shows schematically a tractor and autopilot system.

FIG. 4 shows schematically a tractor and autopilot system. In FIG. 4, farm tractor 405 is equipped with GNSS receiver 410, radio/cell phone 415, display, 3-D map and path processor 420, pitch, roll and yaw sensors 425, accelerometers 430, steering sensor and steering control 435, weight sensor 440, and throttle sensor and throttle control 445. Of these items, radio/cell phone 415, weight sensor 440 and throttle sensor and throttle control 445 are optional. The system may also include an aural warning system such as a horn, buzzer, etc.

GNSS receiver 410 may use the NAVSTAR GPS constellation, Galileo, GLONASS or other global navigation satellite system. The receiver may include the capability to use DGPS radio beacons, space based augmentation systems (such as WAAS, EGNOS, or MSAS), or L-band differential services (such as Ominstar™ or Landstar™). The receiver may also use real-time kinematic (RTK) techniques in conjunction with RTK base stations and/or RTK networks. The receiver also includes appropriate antennas to receive GNSS and correction signals.

Optional radio/cell phone 415 transmits voice and/or data to a base station. Display, 3-D map and path processor 420 includes a microprocessor, volatile and non-volatile memory, and input/output devices including buttons, trackballs, speakers, USB ports, etc. Pitch, roll and yaw sensors 425 may be MEMS based or use other technologies, and may include both orientation (pitch, roll, yaw) and rate (pitch rate, roll rate, yaw rate) sensors. Accelerometers 430 may be MEMS based or use other technologies. Steering sensor and steering control 435 monitors wheel angle information and controls hydraulic steering valves. Optional weight sensor 440 measures the tractor's total weight. The weight sensor may use tire pressure measurements or rely on sensors in wheel hubs or use other technologies. Optional throttle sensor and throttle control 445 measures throttle position and opens and closes the throttle as needed to control tractor speed. The throttle control may also control a continuously variable transmission. Steering, weight, throttle and other sense and/or control functions may be implemented via a data bus, such as an ISO 11783 bus, for example.

The autopilot system of FIG. 4 provides many capabilities including steering a tractor along a predetermined path, providing light-bar course guidance, mapping hazards in a field, controlling variable rate application of sprays. The system also monitors the risk of tractor rollover. When rollover risk exceeds a critical threshold—or, based on knowledge of a planned path over mapped terrain, will exceed a critical threshold in the future—the autopilot may take control of the tractor to prevent rollover (e.g. by slowing down) or warn the tractor operator and provide suggestions (e.g. slow down, turn in a particular direction), or both. The capability to provide warnings of immediate and/or future rollover hazards improves both safety and efficiency of a tractor operation.

Figure 5:
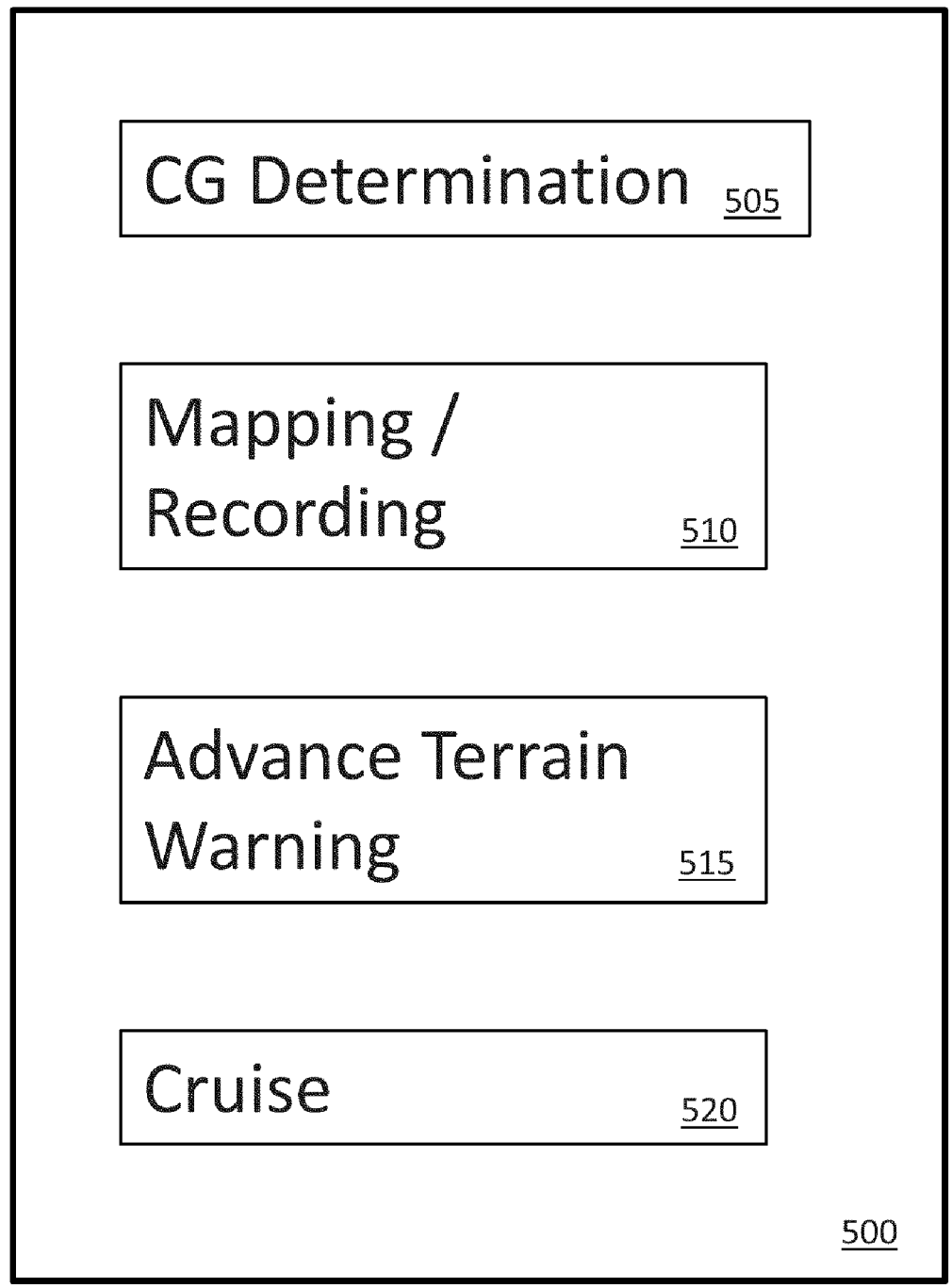
FIG. 5 lists modes of operation of a rollover warning system.

The autopilot system has several modes of operation 500, some of which are shown in FIG. 5. The system may operate in more than one mode simultaneously. In the "CG Determination" mode 505 the system calculates or measures the location of the tractor's center of gravity (or changes in the center of gravity location from a known starting point). In the "Mapping/Recording" mode 510 the system records tractor position and attitude and uses that information to create detailed topographic maps. In the "Advance Terrain Warning" mode 515 the system combines pre-existing maps and knowledge of planned maneuvers to warn an operator of future rollover risks. In "Cruise" mode 520 the system monitors rollover risk without pre-existing map information. In this mode the system may assume that the terrain slope ahead is the same as in the present location, for example. Each of these modes is now described in more detail.

Center of Gravity Determination

Figure 6:
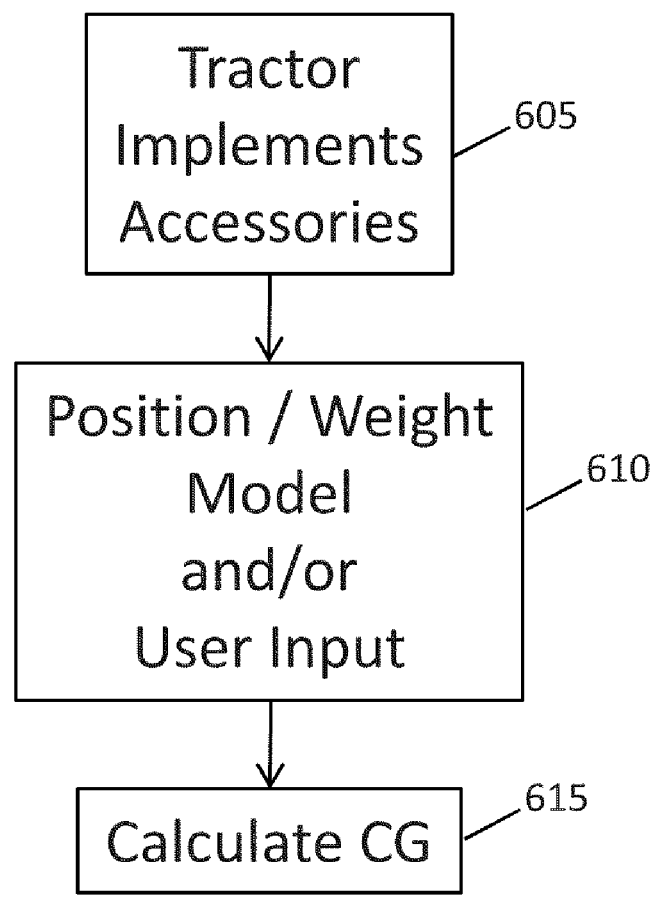
FIG. 6 is a flow chart for calculating tractor CG position.

CG can be calculated for various tractor configurations or input manually by an operator if the location is already known. FIG. 6 is a flow chart for calculating tractor CG position. First the system is defined in step 605 by the type of tractor, attached implements, and accessories. The position and weight of each of these components is determined in step 610. Positions and weights may be obtained from manufacturer's data, a model, or user input, or a combination of sources. Finally, center of gravity is calculated in step 615. As an example, the weight and center of gravity position for a base model tractor may be known. The weight and position of accessories (e.g. spray tanks, ballast weights, fuel, etc) and implements (e.g. defined by hitch position and weight) may then be input by an operator. This data is combined with the basic tractor CG. First the moment (weight times arm) of each item is calculated. Then the sum of the moments is divided by the total weight to find the CG arm of the tractor with all its accessories and implements.

Figure 7:
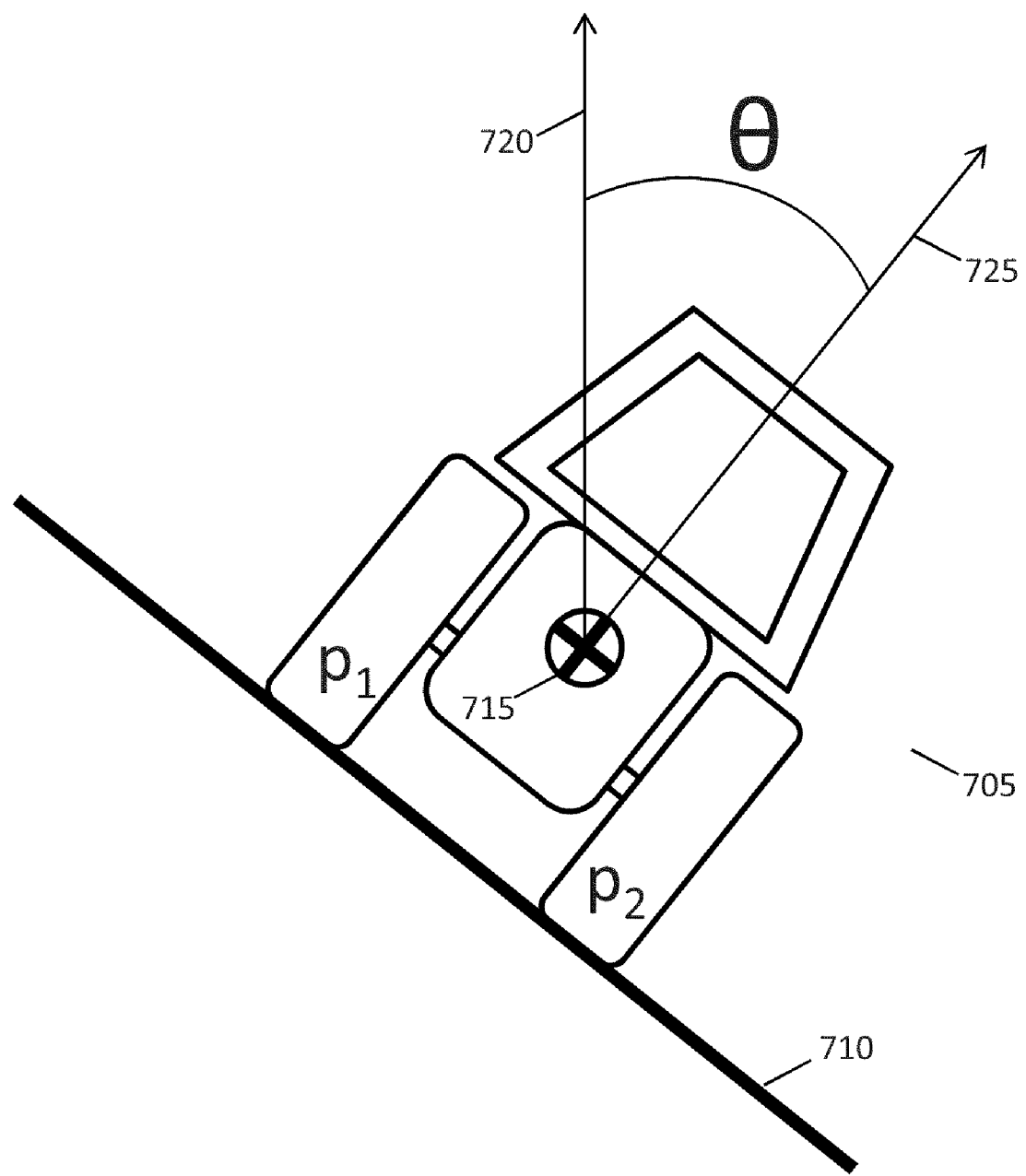
FIG. 7 shows a tractor on a slope and parameters used to determine CG height from tire pressure measurements.

The CG height can also be determined from tire pressure measurements as shown in FIG. 7. These measurements may be used to determine CG height directly or to find changes in CG from a known starting position. FIG. 7 shows a rear view of tractor 705 on slope 710. The location of the CG is marked with circle inscribed with a cross 715. The slope angle θ is the angle between vertical 720 and tractor z-axis 725. The pressures in the uphill and downhill rear tires are $p_1$ and $p_2$, respectively.

Angle θ is measured by the tractor's roll angle sensors while pressures $p_1$ and $p_2$ are measured by pressure sensors in each tire. Appropriate pressure sensors include MEMS pressure sensors mounted in tire valve stems. Such sensors may send pressure data wirelessly. The difference in tire pressure, $p_1-p_2$, for a given roll angle depends on CG height. At a given roll angle, $p_1-p_2$ is greater when the CG is higher, i.e. farther away from the slope. Total tractor weight, tire footprint, level (θ=0) tire pressure differential, distance between tires and other data are used to complete the calculation.

Suppose, for example, that $p_1=p_2$ when θ=0, that the contact area between each tire and the slope is A, and that the distance between the rear tires is W. Then, the height of the center of gravity above the rear axle of the tractor is given approximately by $$L = \frac{\Delta p W A}{2 M g \sin\theta}$$

where Δp is the increase in pressure in the downhill tire, M is the mass of the tractor, g is the acceleration due to gravity and θ is the slope angle as shown in the figure. The relationship between L, Δp and θ may be used during turning maneuvers to find L (or changes in L) even when a slope is not available.

Thus, user input, moment arm calculations, and tire pressure differences may all be used, separately or in combination, by an autopilot system to determine the location of the center of gravity (or changes in the location of the center of gravity) of a tractor. This information combined with tractor attitude (pitch, roll, yaw) and velocity may be used to assess tractor stability and rollover risk.

Mapping/Recording

Figure 8:
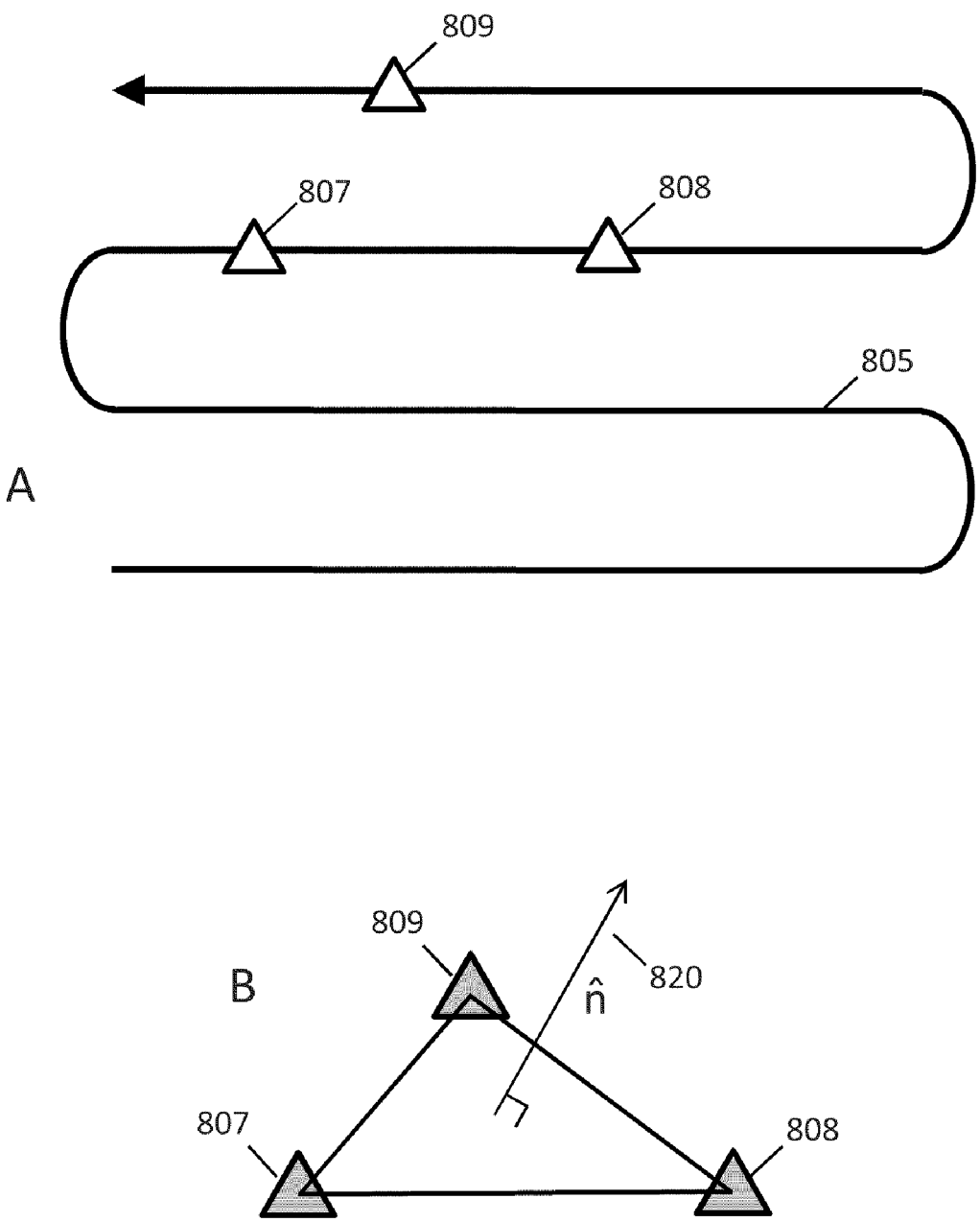
FIGS. 8A and 8B illustrate how elevation data is collected in "Mapping/Recording" mode.

In the "Mapping/Recording" mode the autopilot system records tractor position and attitude and uses that information to create detailed topographic maps. FIGS. 8A and 8B illustrate how elevation data is collected in "Mapping/Recording" mode. The autopilot system records latitude, longitude and elevation as a tractor drives over a field and stores that information for later use by itself or another tractor.

In FIG. 8A path 805 represents a track along which an autopilot controlled tractor is operating. Points 807, 808, 809 are examples of position fixes along the track where the autopilot system records position (x, y, z) and attitude (pitch, roll, yaw) of the tractor. FIG. 8B shows how data at position fixes obtained in FIG. 8A can be used to create triangular segments of a topographic map. The positions of fixes 807, 808, 809 determine the slope of a plane intersecting all three points. The unit normal 820 to the plane is shown in the Figure. Attitude measurements at each position fix may be used to improve the accuracy of normal vectors such as 820.

Figure 9:
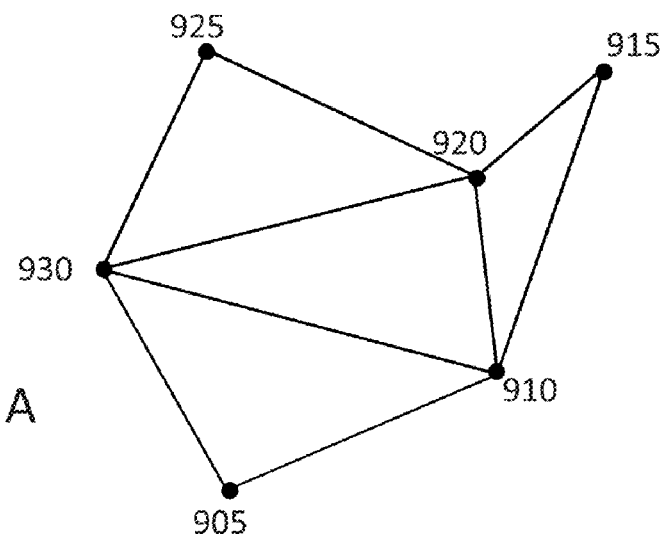
FIG. 9A and 9B illustrate two kinds of terrain maps.
Figure 9:
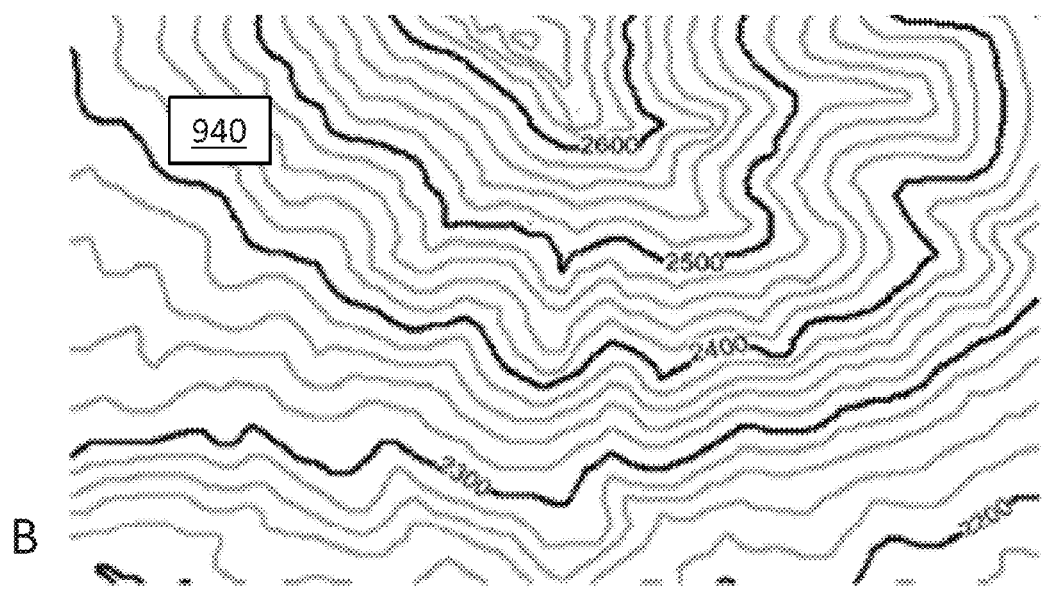

FIGS. 9A and 9B illustrate two kinds of terrain maps that can be generated by the autopilot system. FIG. 9A shows a map created from a network of points (905, 910, 915, 920, 925, 930) while FIG. 9B shows a contour map 940 rendering of the same kind of data.

Usually, "mapping/recording" implies that the terrain ahead is not known. Therefore mapping/recording may take place at slow speed to reduce rollover risk. Alternatively mapping/recording may be done by a high stability vehicle having a wide wheel separation and a low center of gravity. Map data recorded by a high stability vehicle may later used by tractors traversing the same ground.

Advance Terrain Warning

In the Advance Terrain Warning mode the autopilot system has a terrain map available. The map may be one generated earlier in mapping/recording mode by the same tractor or another vehicle. The map may also be obtained from other sources such as satellite imagery. In the Advance Terrain Warning mode the autopilot system provides operator warnings for conditions leading to increased rollover risk such as those listed in FIG. 10. The warnings include: CG near the limit of a stability baseline; high pitch or roll angle; and, planned turn dangerous at current speed or planned turn dangerous at any speed. The autopilot can provide such advance warnings because it has knowledge of both the terrain ahead and the tractor's planned maneuvers.

Figure 11:
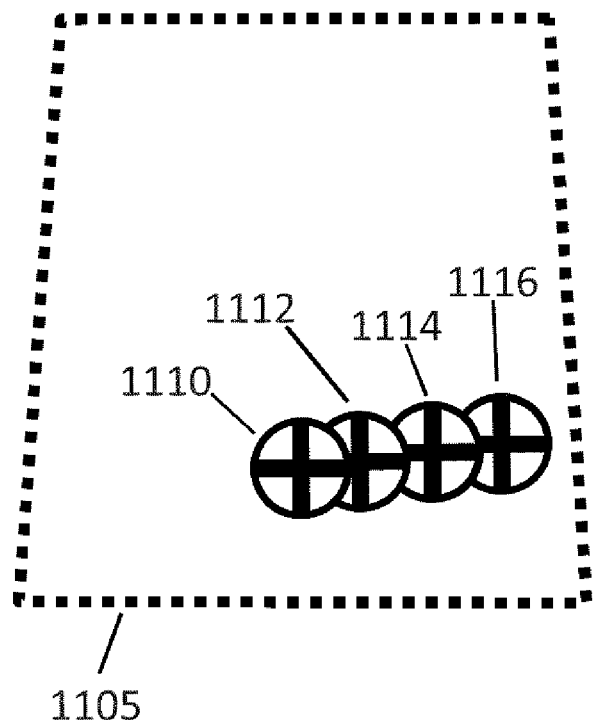
FIG. 11 shows an example of a stability display.

FIG. 11 shows an example of a stability display. In the Figure, dotted line 1105 represents the stability baseline of a tractor. Symbols 1110, 1112, 1114, and 1116 represent the position of the tractor's CG at different times. In FIG. 11, the CG is shown inside the baseline; i.e. in a stable condition. The CG symbol may change color depending on its position inside the baseline. For example the CG may be depicted in green near the center of the baseline and red close to the baseline limits. The current CG position may be depicted brighter while older CG positions are depicted dimmer. When the tractor is not moving, the display shows the static stability situation. When the tractor is moving the display includes effects of centrifugal force. For example, the CG is shown moving to the right in a hard left turn on level ground. An aural warning horn may be provided when CG gets close to baseline limits.

Figure 12:
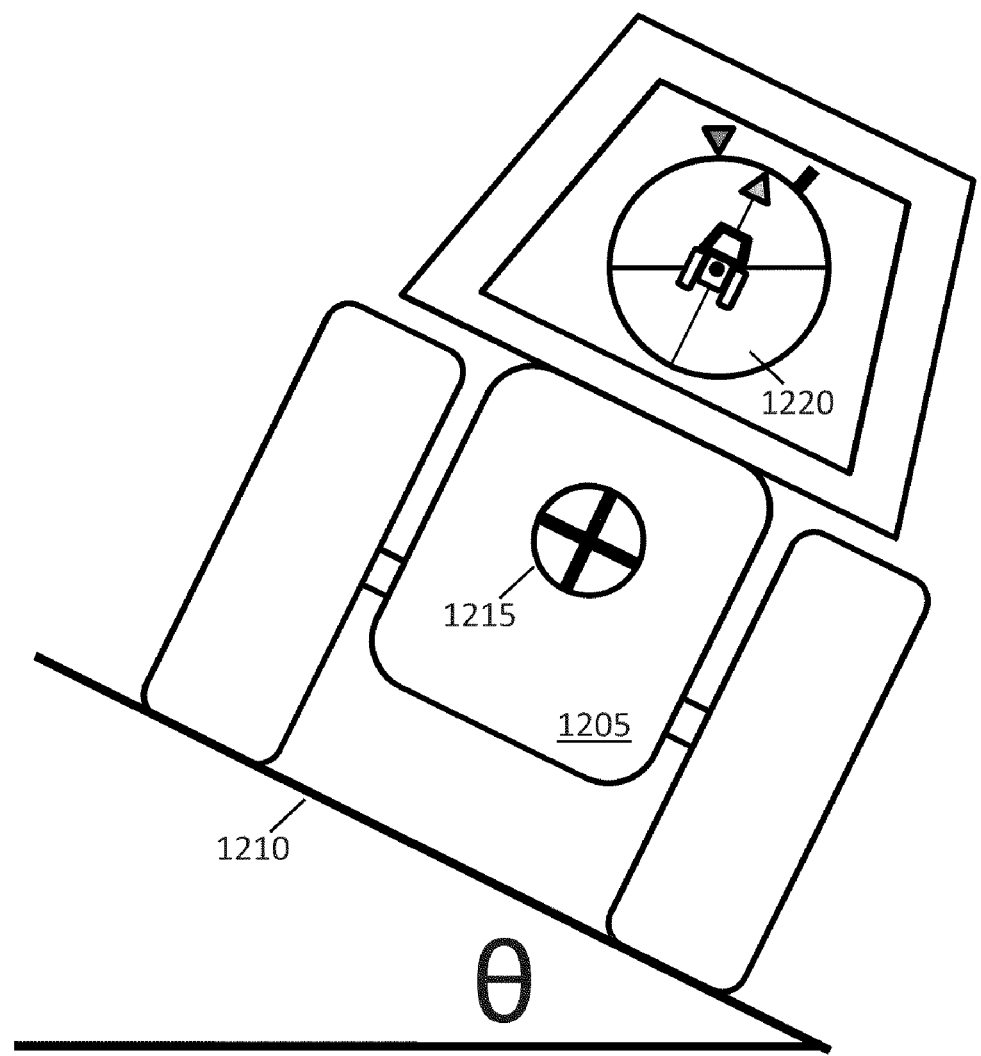
FIG. 12 shows an example of a roll angle display.
Figure 12:
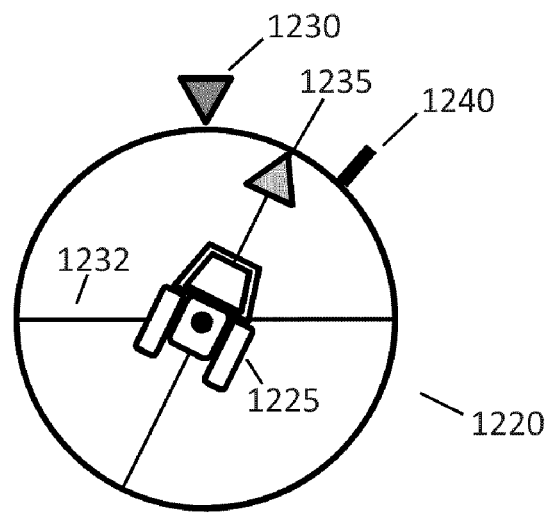

FIG. 12 shows an example of a roll angle display. In FIG. 12 tractor 1205 is traversing a slope 1210. The tractor's center of gravity is marked by symbol 1215. Roll angle display 1220 is shown both inside the tractor cab and separately outside the tractor for clarity. The display includes a miniature tractor 1225 and tractor z-axis indicator 1235, a vertical indicator 1230 and horizon 1232, and a roll limit indicator 1240. The display gives a tractor operator an intuitive picture of the current roll angle of the tractor. Warning lines (e.g. 1240) indicate limits of safe operation. The warning lines may move depending on tractor speed. High roll angles may be tolerable at low speed, for example. Although the display of FIG. 12 is limited to roll angle information, it could easily be extended to show pitch as well, much like an aircraft attitude indicator.

Figure 13:
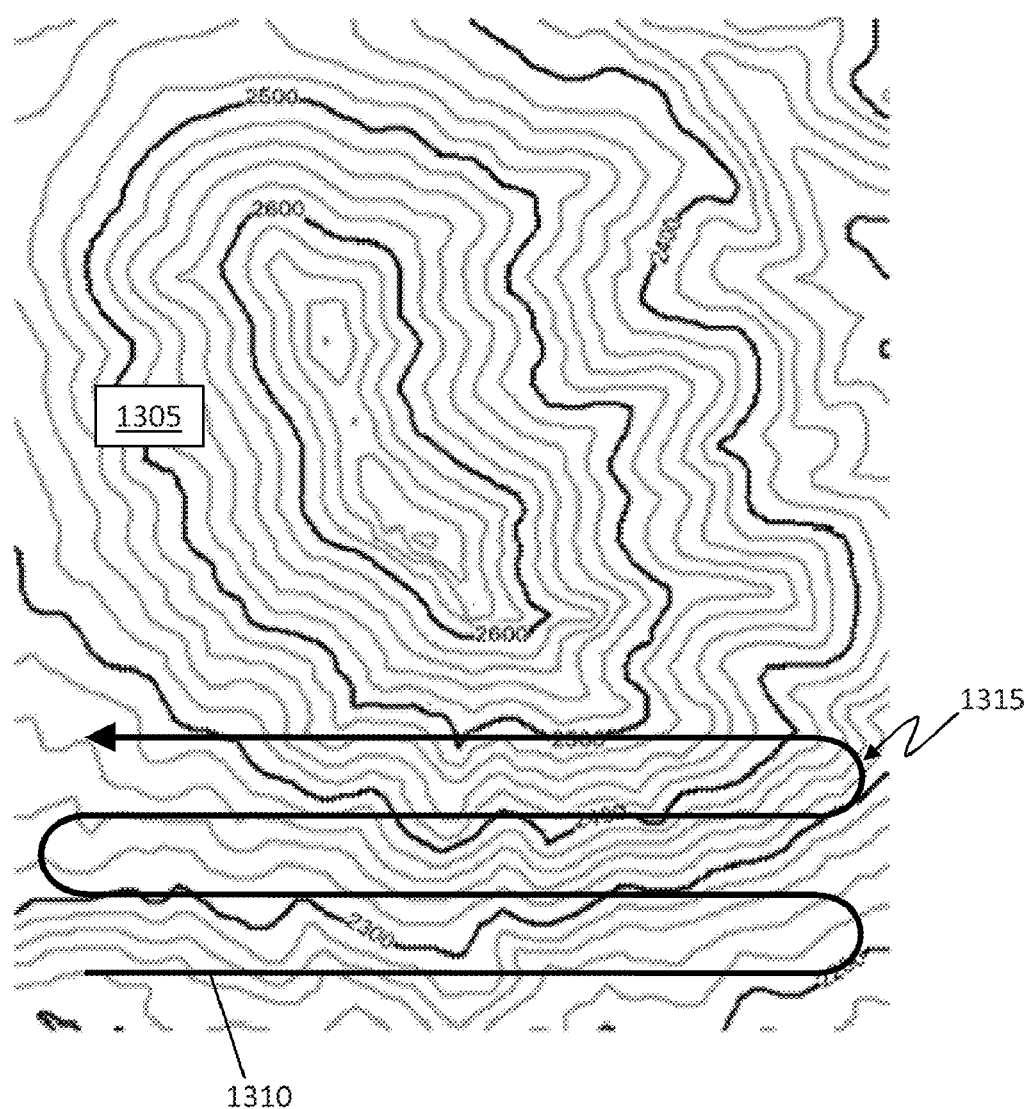
FIG. 13 shows an example of a map with a planned path and warnings.

FIG. 13 shows an example of a map with a planned path and warnings. Conventional autopilots show maps of planned paths, but without terrain information or rollover risk warnings. In FIG. 13 planned tractor path 1310 is shown on topographic map 1305. The autopilot may warn an operator if the planned path will result in high rollover risk. For example, the autopilot may change the path color (e.g. to red) where the path makes uphill turns in steep terrain. Turn 1315 is an example of such a high risk turn. Path warnings may also be speed dependent. A path shown in green (low risk) at low speed may be shown in red (high risk) at higher speeds.

Figure 14:
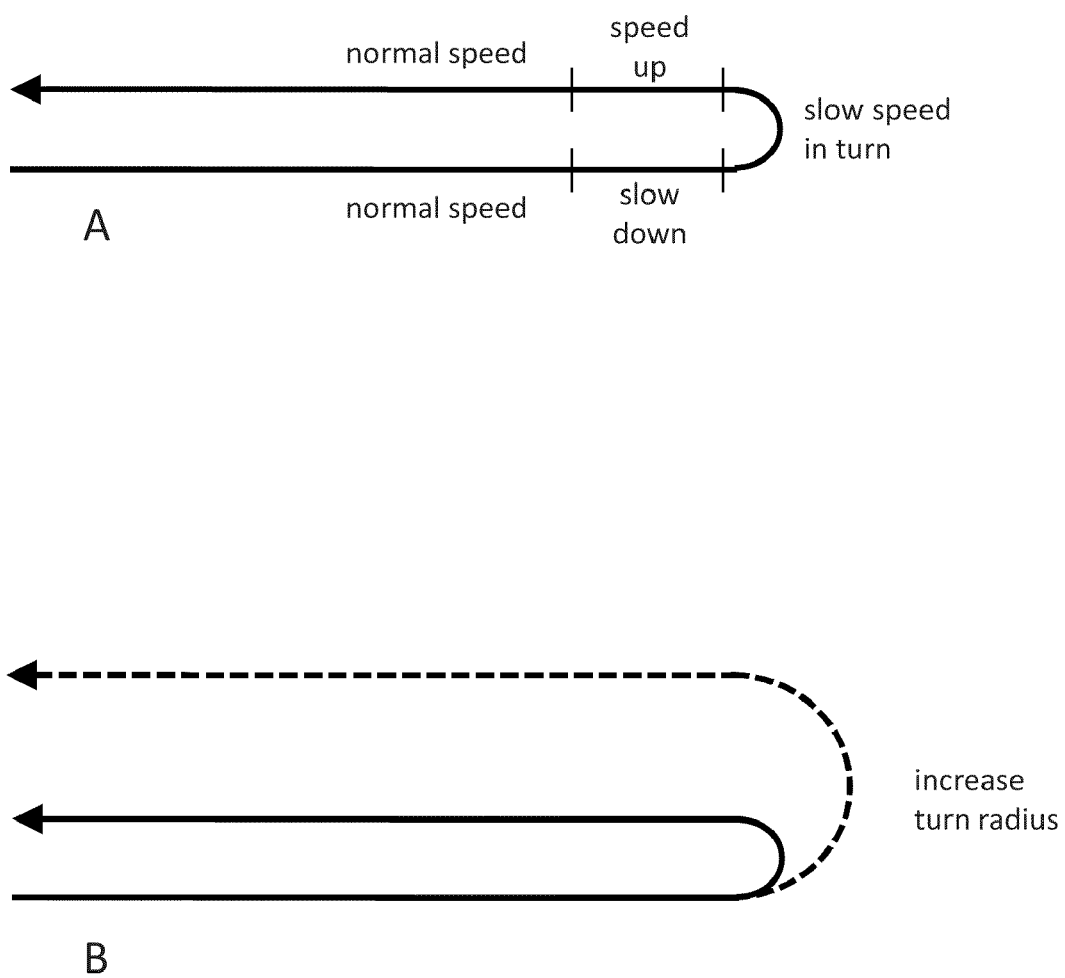
FIGS. 14A and 14B show planned paths with methods to reduce rollover risk.

The autopilot system may change a tractor's path to reduce rollover risk or suggest to the operator that he change the path manually. FIGS. 14A and 14B show planned paths with methods to reduce rollover risk. In FIG. 14A a path is shown in which tractor speed is reduced approaching a turn and increased leaving the turn. In a fully automatic system the autopilot commands these speed adjustments through throttle control. (In this disclosure "throttle" or "throttle control" refer to any of a variety of systems or methods for controlling and/or sensing engine and/or vehicle speed including: a throttle valve, a fuel flow control system, an RPM governor, a continuously variable transmission control, etc.) In a system with a human operator the autopilot may issue maximum speed recommendations to the operator and/or prevent the operator from selecting too high a speed. As an alternative to slowing down, the autopilot may command the tractor (or suggest to its operator, if an operator is present) to increase turn radius as shown in FIG. 14B. In a field with many parallel rows, this may be accomplished by skipping rows, for example.

Figure 15:
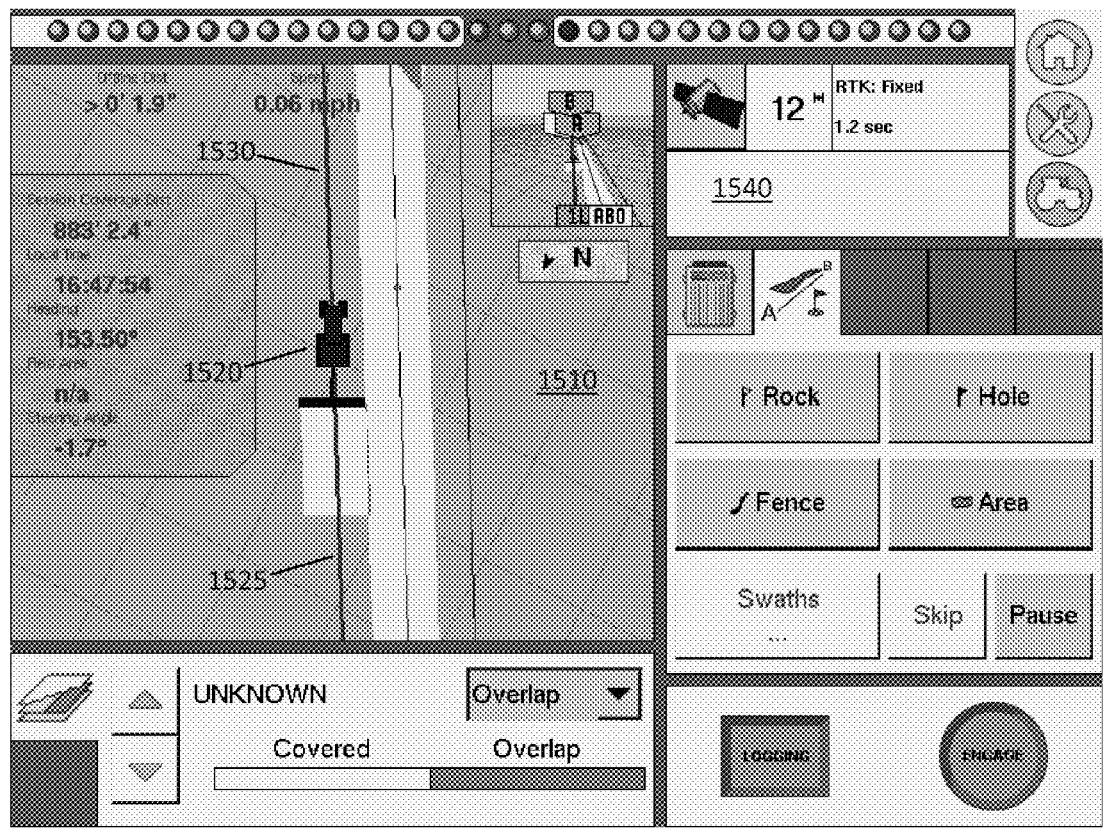
FIG. 15 shows another example of a map display.

FIG. 15 shows another example of a map display. In FIG. 15, display 1500 depicts panes such as map pane 1510 and status pane 1540. Other panes display buttons for marking hazards or controlling autopilot functions, for example. In pane 1510 a tractor is depicted by symbol 1520. Also displayed are paths 1525 that the tractor has already traversed and planned path 1530.

A rollover warning system uses knowledge of the planned path and the terrain over which the path passes to determine levels of future rollover risk. If the planned path includes high rollover risk maneuvers, such as traverses across steep grades or high speed turns, then the system may provide a warning to local or remote operator. For example, the planned path may be depicted in a different color, or as a dashed or flashing line in areas where rollover risk is high. Other visual or aural warnings may be issued.

In addition to, or instead of, a warning the system may also initiate preventive action to prevent a high rollover risk situation from developing. For example, the system may command a speed decrease or complete stop, or it may change the path. As an example, when working a field with many parallel rows, it may be safer to skip one or more rows when turning around at the edge of the field than to turn to the closest adjacent row. The tractor may return to skipped rows later in the job.

Cruise

FIG. 16 illustrates "cruise" mode operation. In this mode, the autopilot does not have the benefit of prerecorded terrain information. Therefore the terrain slope ahead is assumed to be the same as the terrain slope in the present position. In cruise mode the autopilot evaluates the risk of a planned turn assuming that the turn will occur on ground with the same slope as the present slope. Cruise mode may be used simultaneously with mapping/recording mode.

In both "Advance Terrain Warning" and "Cruise" modes the autopilot issues warnings when the risk of rollover exceeds a critical threshold. Liu's stability index, S, is one way to quantify rollover risk (see J. Agricultural Safety and Health, Special Issue (1):171-181, 1998, incorporated herein by reference). S=100 for when stability is maximum; i.e. for a tractor at rest on a level plane. S=0 indicates that a stability limit has been reached and rollover is imminent. Thus, a reduction in stability index corresponds to an increased rollover risk.

Static stability is a function of tractor attitude (pitch, roll, and yaw), center of gravity position and wheel geometry. Dynamic stability depends also on linear and angular tractor velocities.

A static stability index may be defined as:

$$S_{stat} = \left[1 - \sqrt{\frac{\theta^2}{\theta_c^2} + \frac{\varphi^2}{\varphi_c^2}}\right] \times 100$$

Here $\theta$ is the tractor's pitch angle and $\varphi$ is its roll angle. The tractor's static pitch and roll overturn angles are $\theta_c$ and $\varphi_c$ respectively.

A dynamic stability index may be defined as:

$$S_{dyn} = \left[1 - \frac{V}{V_c}\right] \times 100$$

Here V is the tractor's tangential speed along a turn and $V_c$ is Liljedahl's critical speed for a tractor in a steady state circular turn (see Tractors and Their Power Units, Liljedahl et al., p. 272-313, Van Nostrand Reinhold, New York, 1989, incorporated herein by reference). The critical speed is:

$$V_c = \sqrt{\frac{gA_\varphi R}{Z_{cg}\cos(\gamma)}}$$

Here $A_\varphi$ is the shortest horizontal distance in the plane between the center of gravity and the vertical plane going through the tipping axis; R is the turn radius; $Z_{cg}$ is the center of gravity height; $\gamma$ is the angle between the tipping axis and the longitudinal plane; and, g is the acceleration due to gravity near the earth's surface. Turn radius, R, may be calculated by processor 420 using wheel angle information obtained from steering sensor 435. In a side rollover, the tipping axis is approximately the line between the points where the front and rear wheels of the tractor, on the side toward which the tractor is rolling, touch the ground.

Figure 17:
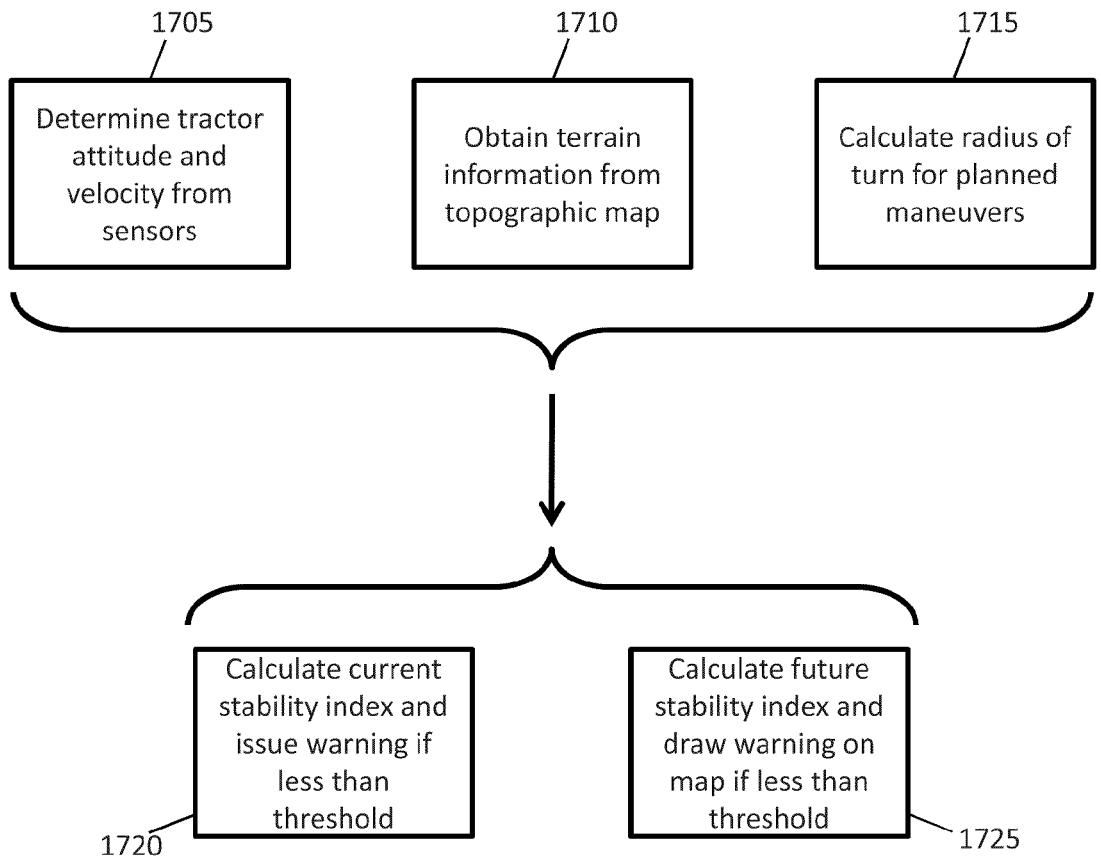
FIG. 17 is a flow chart showing when rollover risk warnings are issued.

FIG. 17 is a flow chart showing when rollover risk warnings are issued. Processor 420 performs the functions in objects 1705, 1710 and 1715 and issues warnings pertaining to current and future rollover risk as specified in objects 1720 and 1725.

In object 1705 the processor determines the tractor's current attitude and velocity from: GNSS receiver 410; pitch, roll and yaw sensors (which may output angle and rate information) 425; and, accelerometers 430. In object 1710 the processor obtains terrain information such as the ground slope along the planned path of the tractor from a topographic map, if available. The map may be one that has been recorded earlier by the autopilot, obtained from a similar autopilot on a different vehicle, derived from satellite imagery, or obtained from some other source. In object 1715 the processor calculates the radius of turn for maneuvers on the planned path along which the autopilot is steering the tractor, if a planned path has been entered into the autopilot. Objects 1705, 1710, and 1715 run independently; sometimes not enough information is available to run objects 1710 and/or 1715.

In object 1720 the processor uses the information obtained in objects 1705, 1710, and 1715, as available, to calculate the current static and dynamic stability indices, $S_{stat}$ and $S_{dyn}$, described above. If either of these indices is less than a threshold value, the autopilot issues a warning to the tractor operator. The warning may be an aural warning such as a bell or horn, or a visual warning such as a red light or warning message on a display. The threshold value for current stability indices is typically about 10 but may be anywhere between about 5 and about 50 based on operator preferences.

In object 1725 the processor uses the information obtained in objects 1705, 1710, and 1715, as available, to calculate the future static and dynamic stability indices, $S_{stat}$ and $S_{dyn}$, described above. If either of these indices is less than a threshold value, the autopilot indicates the future danger by highlighting the tractor's planned path on the display. The path may be highlighted by changing its color (e.g. to red), depiction (e.g. dashed or dotted), or making part of the path blink. The threshold value for future stability indices is typically about 10 but may be anywhere between about 5 and about 50 based on operator preferences. The threshold for future stability may be set to a different value than that for current stability.

Objects 1720 and 1725 run independently; sometimes not enough information is available to run object 1725. Objects 1705-1725 are continually updated by the processor. In object 1710 the autopilot assumes that the ground slope at points ahead along the tractor's planned path is the same as the current ground slope if no map is available.

Figure 18:
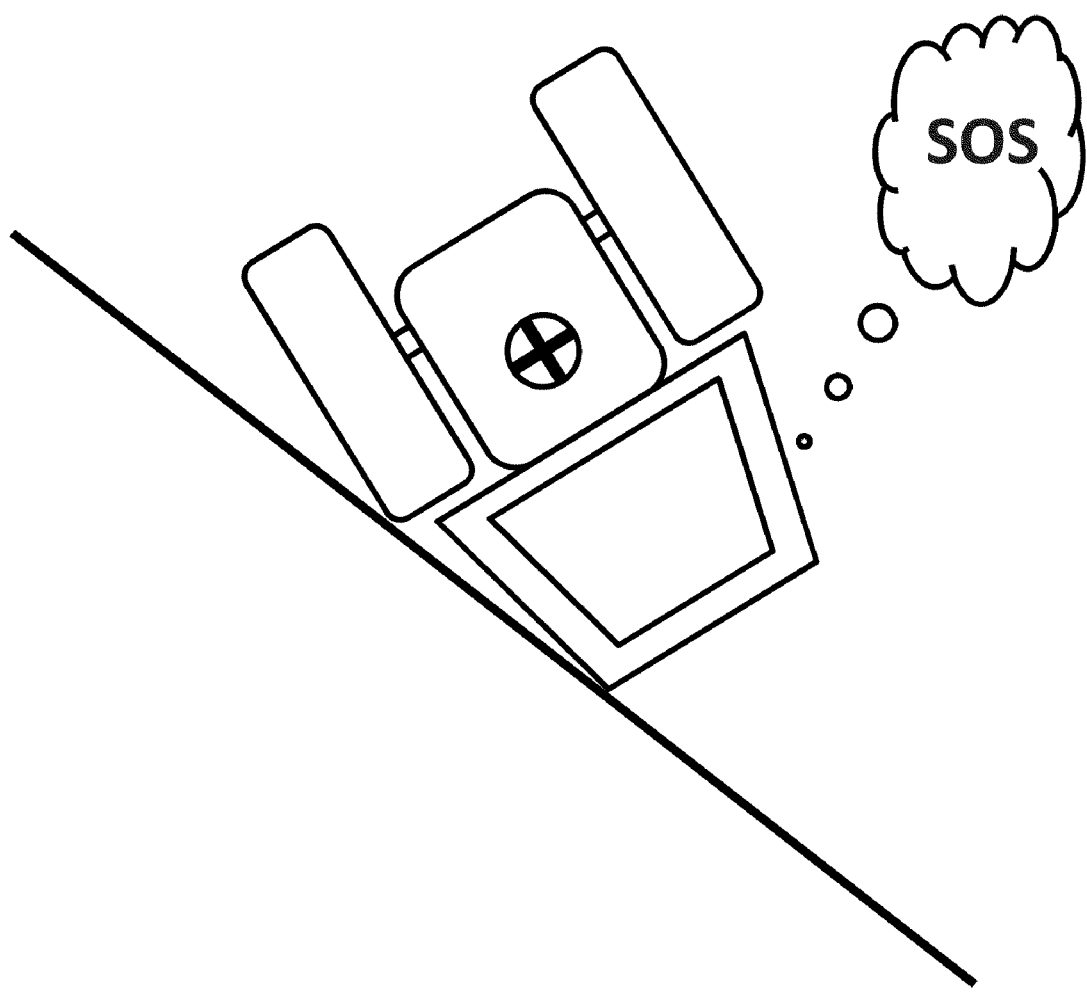
FIG. 18 shows a rollover warning system automatically calling for help in the event of a rollover.

FIG. 18 shows a rollover warning system automatically calling for help in the event of a rollover. The autopilot may send out a distress signal via a communications link (e.g. cell phone, radio, satellite link, wi-fi, wi-max, etc.) whenever a rollover event is detected; e.g. whenever the roll angle exceeds a critical angle.

The autopilot system described here combines tractor state information obtained from autopilot sensors with the autopilot's knowledge of planned maneuvers to evaluate rollover risks. A fully automatic implementation of the system makes speed or heading corrections autonomously. When a human operator is present the system issues warnings and suggestions to operator.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
a steering control that steers the vehicle in response to commands from the processor;
wherein, the processor changes vehicle path when the rollover risk is greater than a predetermined level.

2. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
a throttle sensor that provides throttle information to the processor; and,
a throttle control that operates the throttle in response to commands from the processor;
wherein, the processor reduces vehicle speed by operating the throttle when the rollover risk is greater than a predetermined level.

3. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
the processor calculates the vehicle's center of gravity location as a function of weight and arm of the vehicle and any attached accessories and implements.

4. The system of claim 3 wherein a display shows the center of gravity location in relation to a stability baseline.

5. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
tire pressure sensors that provide tire pressure information to the processor;
wherein the processor calculates the vehicle's center of gravity location as a function of vehicle weight, roll angle and tire pressure.

6. The system of claim 5 wherein a display shows the center of gravity location in relation to a stability baseline.

7. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
the processor generates a topographic map from recorded vehicle position fixes.

8. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
the processor records vehicle position and attitude fixes.

9. The system of claim 8 wherein the processor generates a topographic map from recorded vehicle position and attitude fixes.

10. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor; and;
a roll angle display that shows current roll angle and maximum safe roll angle;
wherein, the processor uses the position, attitude, acceleration, and wheel angle information to estimate vehicle rollover risk.

11. A vehicle rollover risk assessment system comprising:
a processor;
a GNSS receiver that provides vehicle position and speed information to the processor;
pitch, roll and yaw sensors that provide vehicle attitude information to the processor;
a three-axis accelerometer that provides vehicle acceleration information to the processor;
a steering sensor that provides vehicle wheel angle information to the processor;
wherein, the processor uses the position, attitude, acceleration, and wheel angle information to estimate vehicle rollover risk; and,
a communications link that provides voice and/or data communication to a base station;
wherein, the processor sends a distress signal via the communications link whenever the vehicle roll angle exceeds a critical angle.

12. A method for assessing rollover risk comprising:
providing a GNSS receiver that measures vehicle position and speed;
providing pitch, roll and yaw sensors that measure vehicle attitude;
providing a three-axis accelerometer that measures vehicle acceleration;
providing a steering sensor that measures vehicle wheel angle;
determining the value of a static stability index as a function of vehicle attitude; and,
creating a warning whenever the static stability index is less than or equal to a critical value.

13. The method of claim 12 further comprising: changing vehicle path to prevent a rollover.

14. The method of claim 12 further comprising: calculating turn radius as a function of wheel angle;
and, determining the value of a dynamic stability index as a function of vehicle speed and turn radius.

15. The method of claim 14 further comprising: creating a warning whenever the dynamic stability index is less than or equal to a critical value.

16. The method of claim 14 further comprising: changing vehicle speed to prevent a rollover.

17. The method of claim 14 further comprising: changing vehicle path to prevent a rollover.

18. A method for assessing rollover risk comprising:
providing a processor;
providing a GNSS receiver that measures vehicle position and speed;
providing pitch, roll and yaw sensors that measure vehicle attitude;
providing a three-axis accelerometer that measures vehicle acceleration;
providing a steering sensor that measures vehicle wheel angle;
providing a steering control that steers the vehicle in response to commands from the processor;
determining the value of a static stability index as a function of calculated vehicle attitude along a predetermined route; and,
determining locations where the static stability index is less than or equal to a critical value along the route.

19. The method of claim 18 further comprising: creating a warning whenever the static stability index is less than or equal to a critical value.

20. The method of claim 18 further comprising: changing vehicle path to prevent a rollover.

21. A method for assessing rollover risk comprising:
providing a processor;
providing a GNSS receiver that measures vehicle position and speed;
providing pitch, roll and yaw sensors that measure vehicle attitude;
providing a three-axis accelerometer that measures vehicle acceleration;
providing a steering sensor that measures vehicle wheel angle;
providing a steering control that steers the vehicle in response to commands from the processor;
determining the value of a static stability index as a function of calculated vehicle attitude along a predetermined route; and,
determining the value of a dynamic stability index as a function of calculated vehicle speed and turn radius along the route.

22. The method of claim 21 further comprising:
determining locations where the dynamic stability index will be less than or equal to a critical value along the route.

23. The method of claim 21 further comprising: changing vehicle speed to prevent a rollover.

24. The method of claim 21 further comprising: changing vehicle path to prevent a rollover.

25. An autonomous farm tractor autopilot comprising:
a GNSS receiver; pitch, roll and yaw MEMS rate gyroscopes; a three-axis accelerometer; a steering sensor; and a throttle sensor; that measure: position and speed; pitch rate, roll rate and yaw rate; acceleration; wheel angle; and throttle position, respectively, of the autonomous farm tractor;
steering and throttle controls that control steering angle and speed, respectively, of the autonomous farm tractor;
a communications link that provides wireless data communication to a base station; and,
a processor in communication with the GNSS receiver, gyroscopes, accelerometer, steering sensor, throttle sensor, steering control, throttle control and communications link, the processor computing:
center of gravity of the tractor,
static stability index in terms of pitch and roll overturn angles and tractor attitude,
dynamic stability index in terms of critical tangential speed and actual speed and turn radius,
steering and throttle commands that guide the autonomous farm tractor along a predetermined route such that the static and dynamic stability indices do not fall below a threshold value along the route, and
warning messages that alert the base station whenever: an unsafe tractor attitude occurs.

26. The autonomous farm tractor autopilot of claim 25, the processor further computing warning messages that alert the base station whenever: computed stability indices indicate that an unsafe tractor attitude could occur along the predetermined route.

27. The autonomous farm tractor autopilot of claim 25, the processor further computing warning messages that alert the base station whenever: tractor speed is reduced to prevent an unsafe tractor attitude; or, the processor computes steering commands that guide the autonomous farm tractor along a route other than the predetermined route to avoid an unsafe tractor attitude.

28. The autonomous farm tractor autopilot of claim 25, the processor computing center of gravity of the tractor based on type of tractor, and position and weight of any attached implements and accessories.

29. The autonomous farm tractor autopilot of claim 25 further comprising a tire pressure sensor, the processor computing center of gravity of the tractor based on tractor weight, roll angle and tire pressure.

* * * * *